US012583482B2

(12) United States Patent
Kuehner et al.

(10) Patent No.: US 12,583,482 B2
(45) Date of Patent: Mar. 24, 2026

(54) SYSTEMS AND METHODS FOR MODE CONFUSION AVOIDANCE

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 431 days.

(21) Appl. No.: 18/096,312

(22) Filed: Jan. 12, 2023

(65) Prior Publication Data

US 2024/0239379 A1     Jul. 18, 2024

(51) Int. Cl.
*B60W 60/00*      (2020.01)
*B60W 50/14*      (2020.01)

(52) U.S. Cl.
CPC ........ *B60W 60/0051* (2020.02); *B60W 50/14* (2013.01); *B60W 60/0053* (2020.02); *B60W 2050/146* (2013.01)

(58) Field of Classification Search
CPC ......... B60W 60/0051; B60W 60/0053; B60W 50/14; B60W 2050/146
USPC ........................................................ 701/23
See application file for complete search history.

(56) References Cited

U.S. PATENT DOCUMENTS

| | | | |
|---|---|---|---|
| 9,333,983 B2 | 5/2016 | Lathrop et al. | |
| 10,146,357 B2 | 12/2018 | Bendewald et al. | |
| 10,399,576 B2 | 9/2019 | Suzuki et al. | |
| 10,543,850 B2 * | 1/2020 | Chen ..................... | B60W 30/16 |
| 2012/0192237 A1 | 7/2012 | Lee | |
| 2019/0095725 A1 | 3/2019 | Kalghatgi et al. | |
| 2019/0111943 A1 * | 4/2019 | Suzuki .............. | B60W 60/0055 |
| 2019/0329791 A1 * | 10/2019 | Oba ..................... | B60K 28/063 |
| 2022/0126864 A1 * | 4/2022 | Moustafa .............. | B60W 50/14 |
| 2022/0281483 A1 * | 9/2022 | Eriksson ............. | B60W 50/082 |

FOREIGN PATENT DOCUMENTS

| | | |
|---|---|---|
| CN | 110998469 A | 4/2020 |
| CN | 113071505 A | 7/2021 |
| DE | 102020001658 B3 | 5/2021 |

* cited by examiner

*Primary Examiner* — Yazan A Soofi
(74) *Attorney, Agent, or Firm* — Christopher G. Darrow; Darrow Mustafa PC

(57)     ABSTRACT

System, methods, and other embodiments described herein relate to mode confusion avoidance. In one embodiment, a method includes selecting a routine path; determining a likelihood of expected autonomous driving assistance based on a location within the routine path; and generating a notification if autonomous driving assistance has not been enabled and the likelihood exceeds a threshold.

20 Claims, 6 Drawing Sheets

| |
|---|
| Routine Path number |
| Starting Location |
| Ending Location |
| Path of Travel |
| Related Routine Paths |
| Autonomous Driving Assistance Usage |
| Associated Vehicles |
| Associated Operators |
| Associated Occupants |
| Associated Task/Purpose |
| Weather Conditions |
| Traffic Conditions |
| Date/Time Usage |

FIG. 4

SYSTEMS AND METHODS FOR MODE CONFUSION AVOIDANCE

TECHNICAL FIELD

The subject matter described herein relates, in general, to mode confusion, and, more particularly, to notifying operators that a potential expectation of a return to autonomous driving assistance did not occur.

BACKGROUND

Vehicles may be equipped with automated driving assistance systems. In these systems an operator may be expected to control and supervise vehicle, even if lateral control and longitudinal control are handled by the automated driving system. Under such an arrangement, the operator may be expected to take control if the ADS unexpectedly disengages due to issues with sensor data (e.g., an obstructed camera), sudden weather changes, unexpected traffic conditions, and so on.

SUMMARY

In one embodiment, example systems and methods relate to a manner of avoiding mode confusion.

In one embodiment, a method for avoiding mode confusion is disclosed. In one embodiment, the method includes selecting a routine path; determining a likelihood of expected autonomous driving assistance based on a location within the routine path; and generating a notification if autonomous driving assistance has not been enabled and the likelihood exceeds a threshold.

In one embodiment, a mode confusion avoidance system is disclosed. The mode confusion avoidance system includes one or more processors and a memory communicably coupled to the one or more processors. The memory stores an command module including instructions that when executed by the one or more processors cause the one or more processors to select a routine path; determine a likelihood of expected autonomous driving assistance based on a location within the routine path; and generate a notification if autonomous driving assistance has not been enabled and the likelihood exceeds a threshold.

In one embodiment, a non-transitory computer-readable medium including instructions that when executed by one or more processors cause the one or more processors to perform one or more functions is disclosed. The instructions include instructions to select a routine path; determine a likelihood of expected autonomous driving assistance based on a location within the routine path; and generate a notification if autonomous driving assistance has not been enabled and the likelihood exceeds a threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 illustrates one embodiment of a record for a routine path.

DETAILED DESCRIPTION

Systems, methods, and other embodiments associated with improving the avoidance of mode confusion are disclosed herein. A vehicle operator may takeover manual control of a vehicle to enact a short-term maneuver, then cease manual control with the expectation that autonomous driving assistance may resume. However, where vehicle operators are driving along a routine path (e.g., from home to work), they may become accustomed to presuming the resumption of autonomous driving assistance given that it typically occurs. Accordingly, if resumption of autonomous driving assistance does not occur, the vehicle operator may falsely assume that it did resume based on past vehicle performance.

To aid in the avoidance of mode confusion, routine paths may be recorded describing routine paths of travel and an associated usage of autonomous driving assistance along such routine paths. Based on the location of a vehicle with a routine path, a likelihood of expected autonomous driving assistance may be determined. Consequently, if an autonomous driving assistance function has not resumed and the likelihood of expected autonomous driving assistance exceeds a threshold after a cessation of manual control occurs or a potential mode confusion condition is detected (e.g., failure of lane keeping assistance to resume), then a notification may be generated to inform the vehicle operator that the autonomous driving assistance function has not resumed.

Figure 1:
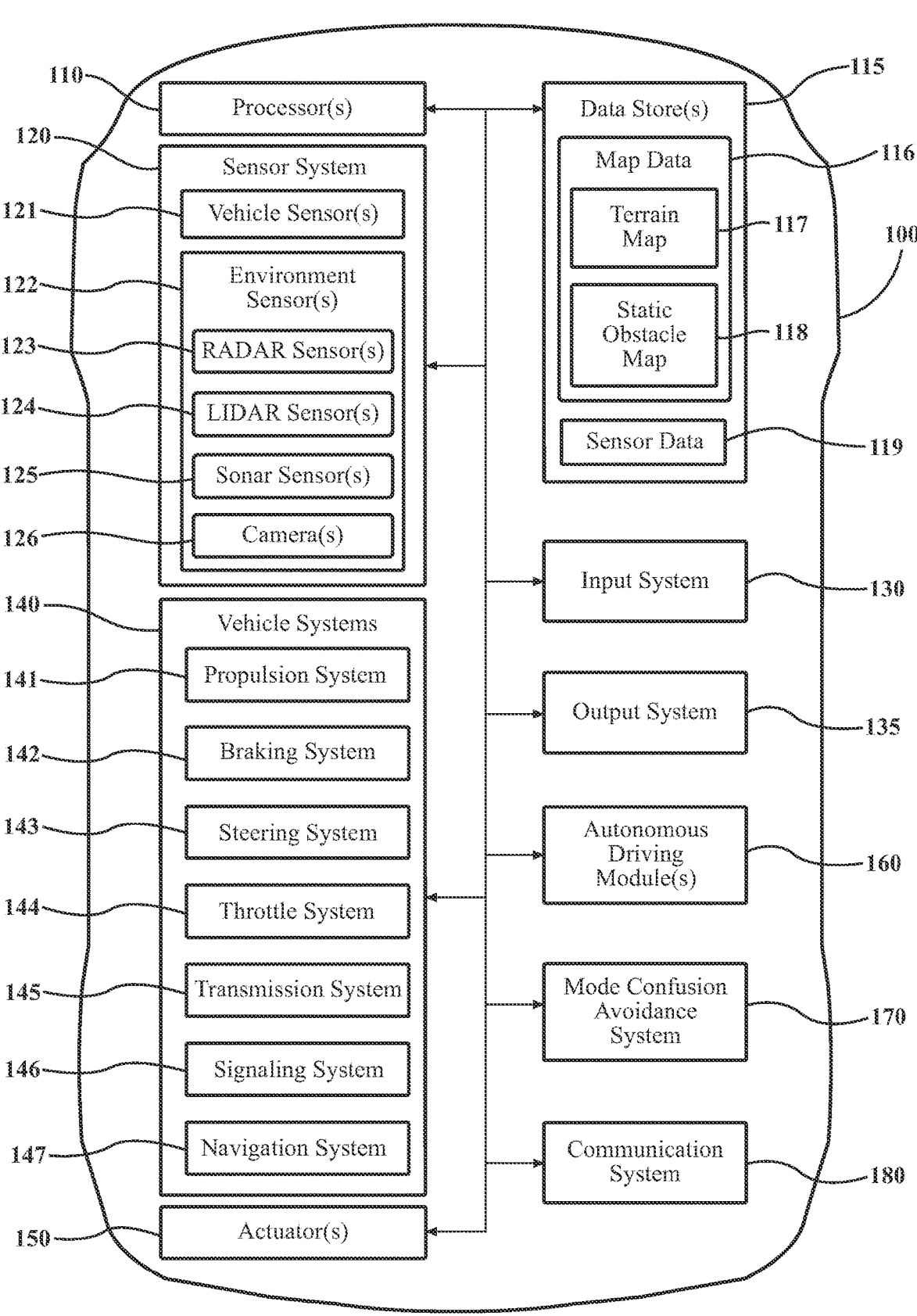
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with avoiding mode confusion. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a mode confusion avoidance system 170 that is implemented to perform methods and other functions as disclosed herein relating to improving the avoidance of mode confusion. As will be discussed in greater detail subsequently, the mode confusion avoidance system 170, in various embodiments, is implemented partially within the vehicle 100, and as a cloud-based service. For example, in one approach, functionality associated with at least one module of the mode confusion avoidance system 170 is implemented within the vehicle 100 while further functionality is implemented within a cloud-based computing system.

Figure 2:
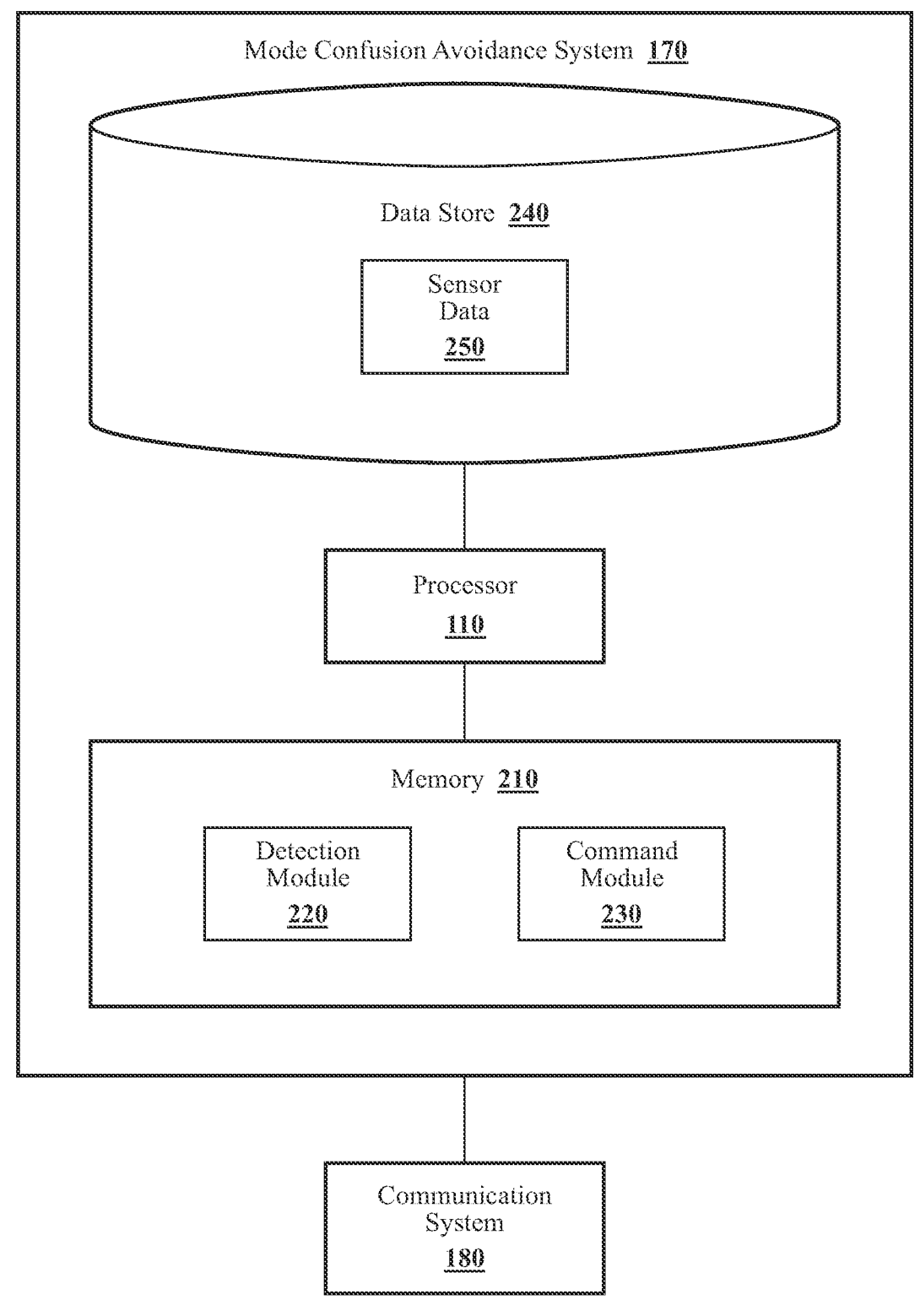
FIG. 2 illustrates one embodiment of a mode confusion avoidance system that is associated with reducing potential mode confusion.

With reference to FIG. 2, one embodiment of the mode confusion avoidance system 170 of FIG. 1 is further illustrated. The mode confusion avoidance system 170 is shown as including a processor 110 from the vehicle 100 of FIG. 1. Accordingly, the processor 110 may be a part of the mode confusion avoidance system 170, the mode confusion avoidance system 170 may include a separate processor from the processor 110 of the vehicle 100, or the mode confusion avoidance system 170 may access the processor 110 through a data bus or another communication path. In one embodiment, the mode confusion avoidance system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
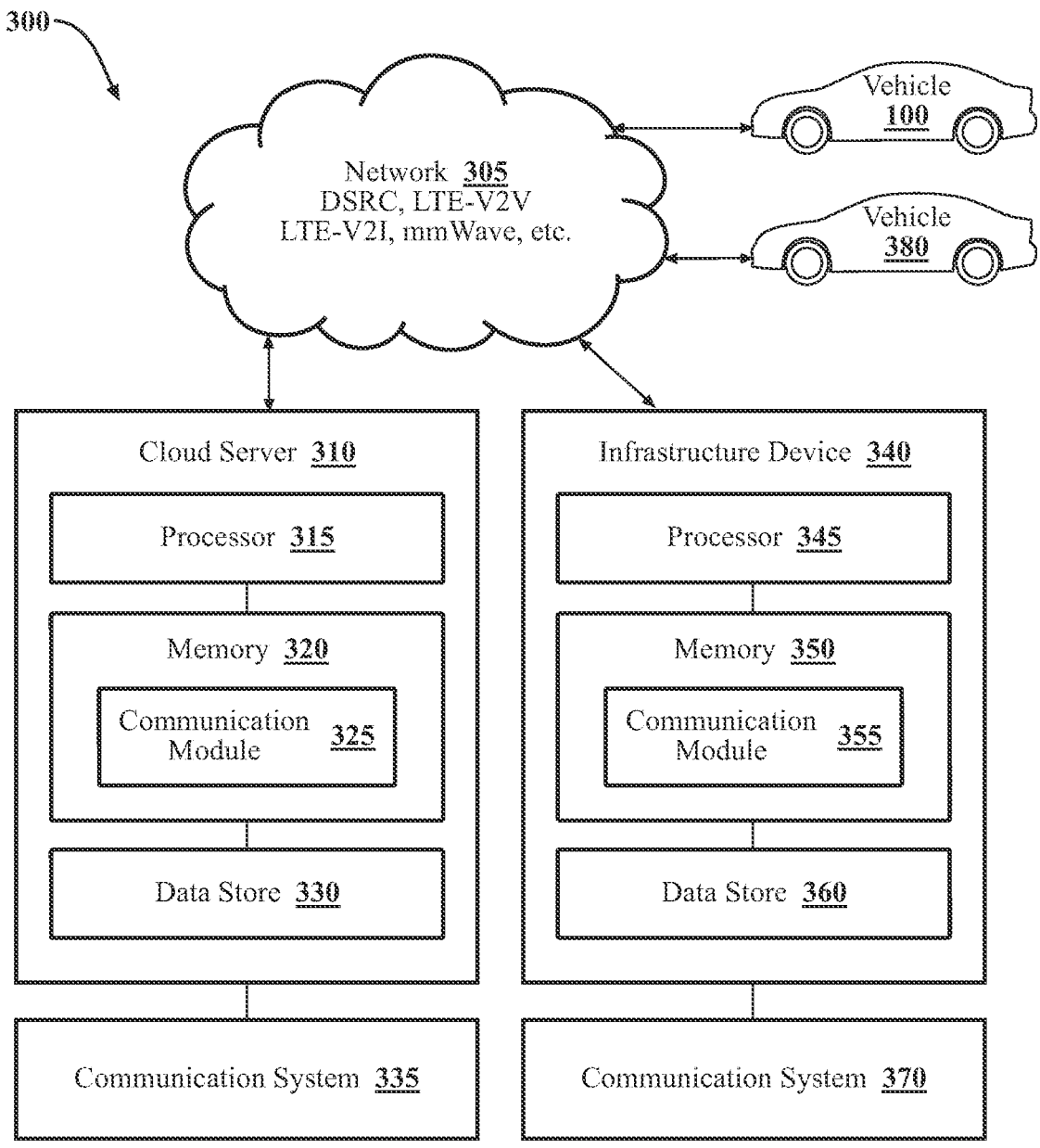
FIG. 3 illustrates one embodiment of the mode confusion avoidance system of FIG. 2 in a cloud-computing environment.

The mode confusion avoidance system 170 as illustrated in FIG. 2 is generally an abstracted form of the mode confusion avoidance system 170 as may be implemented between the vehicle 100 and a cloud-computing environment. FIG. 3 illustrates one example of a cloud-computing environment 300 that may be implemented along with the mode confusion avoidance system 170. As illustrated in FIG. 3, the mode confusion avoidance system 170 is embodied at least in part within the cloud-computing environment 300.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305.

The cloud server 310 is shown as including a processor 315 that may be a part of the mode confusion avoidance system 170 through network 305 via communication unit 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the mode confusion avoidance system 170 through network 305 via communication unit 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on.

Accordingly, in addition to information obtained from sensor data 250, mode confusion avoidance system 170 may obtain information, such as routine paths described below, from cloud servers (e.g., cloud server 310), infrastructure devices (e.g., infrastructure device 340), other vehicles (e.g., vehicle 380), and any other systems connected to network 305.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the mode confusion avoidance system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the database 240 further includes routine paths.

A routine path is a record that has been identified by detection module 220 as representing a path routinely taken by a vehicle, an operator in control of the vehicle, or an occupant of a vehicle. In some embodiments, a routine path may not be associated with a specific vehicle, operator, or an occupant, but rather a specific task or purpose that exhibits routine paths (e.g., pizza delivery).

An example of a record describing a routine path is shown in FIG. 4. In such an example, a routine path number may be used to uniquely identify the routine path. Such a routine path may further contain a specific start point, end point, and path of travel defining the routine path. The routine path may also contain any information about variables that may affect the preference for a routine path (e.g., vehicle, vehicle operator, task/purpose, traffic, weather, time of day, day of week, direction of travel, destination). In some embodiments, multiple routine paths may cover the same geographical area, or a portion thereof, but differ with respect to variables that affect the preference for each routine path (e.g., sensor data 250 may have a different set of routine paths associated with each family member that utilizes the vehicle).

Furthermore, the routine path may also contain any information regarding the usage of any automated driving assistance employed along the path of travel, where automated driving assistance includes any different levels of automation, including advanced driving assistance functions, semi-autonomous functions, and fully autonomous functions. For example, the routine path may indicate the frequency, duration, likelihood, or other characteristics of any automated driving assistance along the path of travel. For example, a routine path may indicate that an operator routinely engages automated driving assistance for the full path of travel; disengages automated driving assistance after a specific area; engages automated driving assistance except for temporary stops/departures along the path of travel exhibiting a particular characteristic (e.g., fast food drive thru, convenience stores, pharmacy); and so on.

In some instances, a routine path may be related to other routine paths. For example, a driver may typically take a first routine path to work except that sometimes the driver takes a detour (e.g., a second routine path) to enjoy a scenic drive through a park before returning to the first routine path. As such, a routine path may contain information designating related routine paths and the nature of that relation. For example, a routine path may contain information describing where a related routine path connects to the routine path (e.g., departs at a first location, merges at a second location), the frequency in which it used, and any variables that may affect the preference for such a related routine path (e.g., traffic, weather, time of day, day of week).

In some instances, a routine path may designate a sub-path relationship indicating that it belongs to a set of routine paths described by a primary routine path. For example, a vehicle may routinely travel between a first and second location but take a different potential number of routine sub-paths to get between the first and second location. In such a situation, the routine sub-paths may each have their own routine path information while also being further identified together within a primary routine path that represents the ensemble of sub-paths typically representing such travel from the first to second location.

In some embodiments, the routine path may further specify a vehicle, operators, occupants, tasks, purposes, or other factors associated with the use of the routine path. For example, some vehicles (e.g., college campus shuttle vans) may typically only follow certain routes, regardless of the operator or occupants. As another example, a routine path may be predicated on the occupant rather than the operator of a vehicle, such as where the occupant has engaged a livery service, paratransit service, or other on-demand transportation services. As another example, a routine path may be associated with tasks or purposes exhibiting the use of routine paths, such as food delivery, materials delivery (e.g., construction materials), road cleaning, snow removal, and so on.

The detection module 220, in one embodiment, is further configured to perform additional tasks beyond controlling the respective sensors to acquire and provide the sensor data 250. For example, the detection module 220 includes instructions that cause the processor 110 to identify and record routine paths.

In one approach, the detection module 220 uses a machine learning algorithm embedded within the detection module 220, such as a convolutional neural network (CNN), to identify routine paths over the sensor data 250 from which further information is derived. Of course, in further aspects, the detection module 220 may employ different machine learning algorithms or implements different approaches for performing the routine path identification. Whichever particular approach the detection module 220 implements, the detection module 220 provides an output of records identifying routine paths associated with the vehicle, the operator, the occupant, a task/purpose, and so on, which are then stored in sensor data 250.

In another approach, the detection module may receive routine paths via communication system 180. For example, if a bus is reassigned from its regular route to another, a transportation operator may provide a replacement set of routine paths for the bus to follow via its dispatch system. As another example, a construction zone may have an infrastructure device that provides different sets of routine paths for vehicles to follow through the construction zone as lanes are closed or opened. In such an embodiment, detection module 220 may receive routine paths via communication system 180 and store such routine paths in sensor data 250. In some embodiments, detection module 220 may perform validation to ensure that the routine paths apply to the vehicle, operator, occupant, task/purpose, and so on. Where validation fails, detection module 220 may provide a notification instructing the reason for failure and the routine path at issue.

In one embodiment, the command module 230 generally includes instructions that function to control the processor 110 or collection of processors in the cloud-computing environment 300 to aid in the avoidance of mode confusion, such as where automated driving assistance does not engage after a manual control intervention.

In some embodiments, based on a given location, command module 230 may determine if it is within the scope of one or more routine paths. In some embodiments, command module 230 may select a routine path based in part on the extent to which the vehicle or its contents (e.g., operator, occupant(s), load), or a combination thereof fit characteristics associated with a routine path. In some embodiments, command module 230 may select a routine path based in part on the extent to which the current time, date, weather, traffic, or other characteristics associated with a routine path exhibits consistency or lack thereof with a routine path. In some embodiments, command module 230 may be instructed to use a routine path, such as one provided via communication system 180 for use in a particular context (e.g., navigating construction zone traffic). In some embodiments, command module 230 may evaluate a routine path to determine if it remains valid in the current context. For example, if a routine path is not currently possible due to road closures, traffic conditions, weather conditions, or other intervening factors, command module 230 may determine that a different routine path or no routine path is suitable.

In some embodiments, command module 230 may detect an interruption to automated driving assistance for a vehicle. For example, an operator may have undertaken manual control in order to make a lane change, pass another vehicle, etc. As another example, an event external to the vehicle may have caused a disengagement, such as traffic or weather conditions. In some embodiments, external control of the vehicle (e.g., by V2V, V2I, V2X) may cause an interruption to automated driving assistance of a vehicle, while in some embodiments the cessation of external control may constitution an interruption to automated driving assistance of a vehicle (e.g., due to a communication failure).

In some embodiments, command module 230 may detect that a potential mode confusion condition exists. For example, a potential mode confusion condition may arise when an automated driving assistance fails to re-engage, such as after manual driving has ceased. For instance, after changing lanes under manual control, a lane-keeping assist system may fail to reengage because the lane markings are not sufficiently visible to the system. As another example, a failure of automated driving assistance to re-engage may occur because of water spray from other vehicles affecting a vehicle's cameras.

As another example, a cessation of manual control that does not result in the resumption of an automated driving assistance in effect prior to manual control event may be sufficient for a potential mode confusion condition to exist. For example, if a vehicle operator disabled an aspect of automated driving assistance, such as the lane-keeping assist system, then ceases to provide any manual inputs relevant to the disabled feature at some point while under manual control (e.g., steering inputs), a potential mode confusion condition may be determined to exist.

In some embodiments, command module 230 may determine whether a resting state exists. For example, a driver who has engaged in manual control, then ceased driving in expectation of a return to automated driving assistance, may nonetheless keep their hands on the steering wheel. In such a context, the operator's hands may transmit various changes to the steering wheel even though it is not the operator's intent to manually control the vehicle. Accordingly, command module 230 may analyze steering, braking, acceleration, or other inputs to determine if they exhibit active manual control or a resting state. For example, command module 230 may analyze the steering signal in terms of frequency, amplitude, periodicity, aperiodicity, or other measurements through methods known in the art to determine if the steering signal is representative of active manual control or a resting state. As another example, command module 230 may analyze the acceleration input (e.g., gas pedal) to determine if acceleration signal is representative of active manual control or a resting state. For example, a driver who has entered a resting state may no longer be exerting sufficient pressure on the pedal to maintain the speed limit or the usual expected speed recorded along the path of travel. In some embodiments, if command module 230 detects a resting state it may be treated the same as a cessation of manual control.

In some embodiments, command module 230 may determine the likelihood that a vehicle would be expected to perform automated driving assistance at a given point within the path of travel, along a portion of the path of travel, or the entire length of the path of travel. In some embodiments, command module 230 may use data regarding the usage of automated driving assistance contained within the routine path, information from sensor data 250, or other sources to generate or adjust the likelihood of expected automated driving assistance at any point along the path of travel in the routine path. In some embodiments, a likelihood of expected automated driving assistance may be determined with respect to each automated driving assistance function or a subset thereof (e.g., only available functions).

In some embodiments, command module 230 may also further evaluate any information regarding the disabling of any automated driving assistance, including the extent to which vehicle parameters or the surrounding environment exhibits consistency or inconsistency with the routine path, to adjust the likelihood of expected automated driving assistance. For example, if the operator disabled an automated driving assistance function in weather conditions that typically don't exist along the routine path, command module 230 may reduce the likelihood of expected automated driving assistance based on such an inconsistency.

In some embodiments, command module 230 may also further evaluate any information regarding a failure to re-engage any automated driving assistance, including the extent to which vehicle parameters or the surrounding environment exhibits consistency or inconsistency with the routine path, to adjust the likelihood of expected automated driving assistance. For example, where traffic conditions are the reason for a failure to re-engage any automated driving assistance, the likelihood of expected automated driving assistance may be adjusted downward until the traffic condition ceases to exist.

In some embodiments, command module 230 may also further evaluate any information regarding ongoing manual control or lack thereof, including the extent to which any manual control exhibits consistency or inconsistency with the routine path, in estimating the likelihood of expected automated driving assistance. For example, where an operator is clearly actively engaged in manual driving or engaged in a significant departure from a routine path that is not covered by another routine path, command module 230 may estimate the likelihood of expected automated driving assistance at or near zero. As another example, where the operator has ceased engaging in manual driving, command module 230 may apply a function of time, such as a ramp up function, to adjust the estimate of the likelihood of expected automated driving assistance. In one embodiment, where command module 230 determines a resting state has come into existence, command module 230 may treat such a resting state as equivalent to a cessation of manual control and adjust the estimate of the likelihood of expected automated driving assistance the same as described herein with respect to a cessation of manual control.

In some embodiments, command module 230 may generate a notification if a likelihood of expected automated driving assistance exceeds a threshold, such as when any automated driving assistance associated with the likelihood of expected automated driving assistance remains disabled after a manual control event ends. In various embodiments, the notification may take form of an audio notification, a visual notification, a text notification, and so on. In some embodiments, the notification may display a graphical representation of automated driving assistance typically expected to be in effect (e.g., such as those whose likelihood of expected automated driving assistance exceeds a threshold) with color or other visual indicators to denote whether they are in effect (e.g., green for operative, blinking red for inoperative). In some embodiments, such a visual representation may also operate during manual control with the graphical representation of automated driving assistance exhibiting further or different visual indicators to indicate which functions are disabled or suppressed as appropriate (e.g., blinking green with a red line through it).

It should be appreciated that the command module 230 in combination with the prediction model 270 can form a computational model such as a machine learning logic, deep learning logic, a neural network model, or another similar approach. In one embodiment, the prediction model 270 is a statistical model such as a regression model that estimates the conditional expectation of automated driving assistance along a routine path. Accordingly, the model 270 can be a polynomial regression (e.g., least weighted polynomial regression), least squares or another suitable approach. Moreover, in alternative arrangements, the prediction model 270 is a probabilistic approach such as a hidden Markov model. In either case, the command module 230, when implemented as a neural network model or another model, in one embodiment, electronically accepts the sensor data 250 as an input. Accordingly, the command module 230 in concert with the prediction model 270 produce various determinations/assessments as an electronic output that characterizes the noted aspect as, for example, a single electronic value. Moreover, in further aspects, the mode confusion avoidance system 170 can collect the noted data, log responses, and use the data and responses to subsequently further train the model 270.

Figure 5:
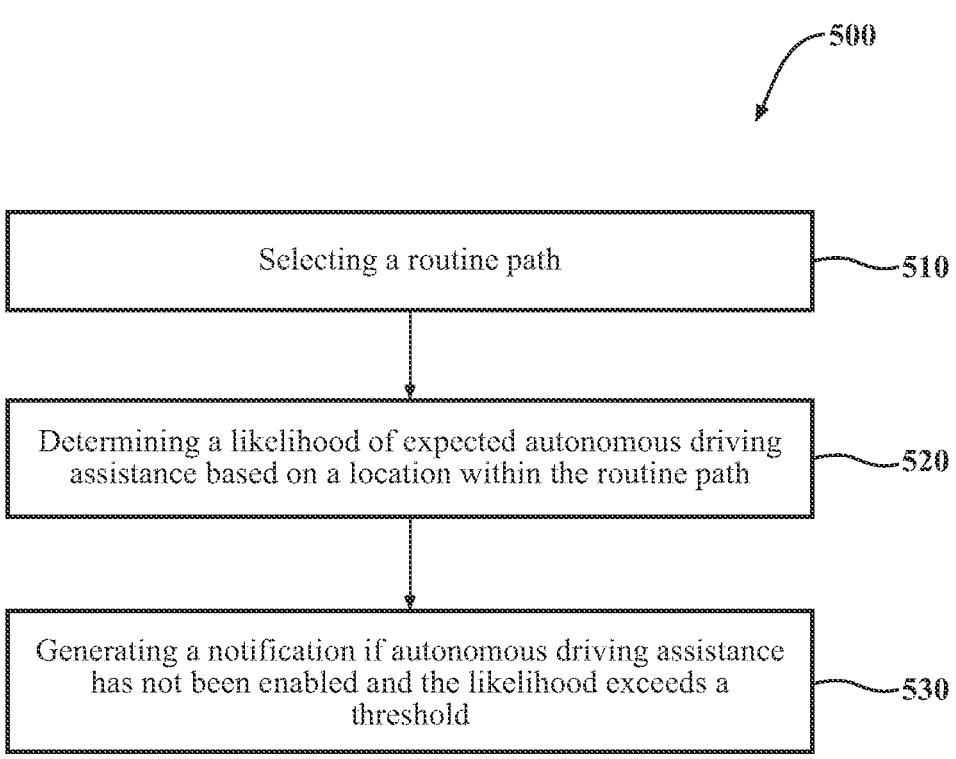
FIG. 5 illustrates one embodiment of a method for mode confusion avoidance.

Additional aspects of avoiding mode confusion will be discussed in relation to FIG. 5. FIG. 5 illustrates a flowchart of a method 500 that is associated with avoiding mode confusion. Method 500 will be discussed from the perspective of the mode confusion avoidance system 170 of FIGS. 1 and 2. While method 500 is discussed in combination with the mode confusion avoidance system 170, it should be appreciated that the method 500 is not limited to being implemented within the mode confusion avoidance system 170 but is instead one example of a system that may implement the method 500.

At 510, the command module 230 may select a routine path for use with a vehicle. For example, command module 230 may select one or more routine paths associated with a given location of the vehicle. In some embodiments, command module 230 may further select between routine paths based on the direction of travel, the destination of travel, the vehicle, the vehicle operator, an occupant, a task, a purpose, and so on. In various embodiments, command module 230 may also select between routine paths based on vehicle parameters, surrounding environment conditions, date, time, weather, traffic, and so on. For example, command module 230 may select a routine path on how the information contained within a routine path best matches the current location of the vehicle, the identity of the vehicle operator, the identity of an occupant, the type of task/purpose, vehicle parameters, surrounding environment conditions, date, time, weather, traffic, other factors, or a combination thereof.

At 520, the command module may determine a likelihood of expected autonomous driving assistance based on a location within the routine path. For example, command module 230 may determine the likelihood that a vehicle would be expected to perform automated driving assistance at the location, along a portion of the path of travel encompassing the location, or the entire length of the path of travel encompassing the location. In some embodiments, command module 230 may use data regarding the usage of automated driving assistance contained within the routine path, information from sensor data 250, or other sources to generate or adjust the likelihood of expected automated driving assistance based on the location within a selected routine path. In some embodiments, a likelihood of expected automated driving assistance may be determined with respect to each automated driving assistance function or a subset thereof (e.g., only available functions) for the location. In some embodiments a likelihood of expected automated driving assistance may be determined based on information from more than one routine path, such as where the vehicle is transitioning from one routine path to another.

In some embodiments, command module 230 may also further evaluate any information regarding the disabling of any automated driving assistance, including the extent to which vehicle parameters or the surrounding environment exhibits consistency or inconsistency with the routine path, to adjust the likelihood of expected automated driving assistance.

In some embodiments, command module 230 may also further evaluate any information regarding a failure to re-engage any automated driving assistance, including the extent to which vehicle parameters or the surrounding environment exhibits consistency or inconsistency with the routine path, to adjust the likelihood of expected automated driving assistance.

In some embodiments, command module 230 may also further evaluate any information regarding ongoing manual control or lack thereof, including the extent to which any manual control exhibits consistency or inconsistency with the routine path, in estimating the likelihood of expected automated driving assistance. For example, where an operator is clearly actively engaged in manual driving or engaged in a significant departure from a routine path that is not covered by another routine path, command module 230 may estimate the likelihood of expected automated driving assistance at or near zero. As another example, where the operator has ceased engaging in manual driving, command module 230 may apply a function of time, such as a ramp up function, to adjust the estimate of the likelihood of expected automated driving assistance. In one embodiment, where command module 230 determines a resting state has come into existence, command module 230 may treat such a resting state as equivalent to a cessation of manual control and adjust the estimate of the likelihood of expected automated driving assistance the same as described herein with respect to a cessation of manual control.

At step 530, command module 230 may generate a notification if autonomous driving assistance has not been enabled and the likelihood exceeds a threshold. In various embodiments, the notification may take form of an audio notification, a visual notification, a text notification, and so on. In some embodiments, the notification may display a graphical representation of automated driving assistance typically expected to be in effect (e.g., such as those whose likelihood of expected automated driving assistance exceeds a threshold) with color or other visual indicators to denote whether they are in effect (e.g., green for operative, blinking red for inoperative). In some embodiments, such a visual representation may also operate during manual control with the graphical representation of automated driving assistance exhibiting further or different visual indicators to indicate which functions are disabled or suppressed as appropriate (e.g., blinking green with a red line through it).

In some embodiments, command module 230 may only generate notification if the likelihood of expected autonomous driving assistance exceeds a threshold after a potential mode confusion condition is determined to exist. For example, if an autonomous driving assistance fails to re-engage after a cessation of manual control or upon the detection of a resting state, command module 230 may determine that a potential mode confusion condition exists. As another example, if an autonomous driving assistance function is disabled and not resumed after ceasing relevant manual control or upon the detection of a resting state with respect to a relevant manual control.

In some embodiments, the notification may be given with higher intensity, additional repetitions, more frequently, or so on relative to a notification that would occur if the likelihood of expected autonomous driving assistance does not exceed a threshold. In some embodiments, the intensity of the notification or any other adjustments thereof may depend on the extent to which the likelihood of expected autonomous driving assistance exceeded the threshold. In some embodiments, the notification may be delayed until the likelihood of expected autonomous driving assistance exceeds the threshold for a pre-determined period of time.

Figure 6:
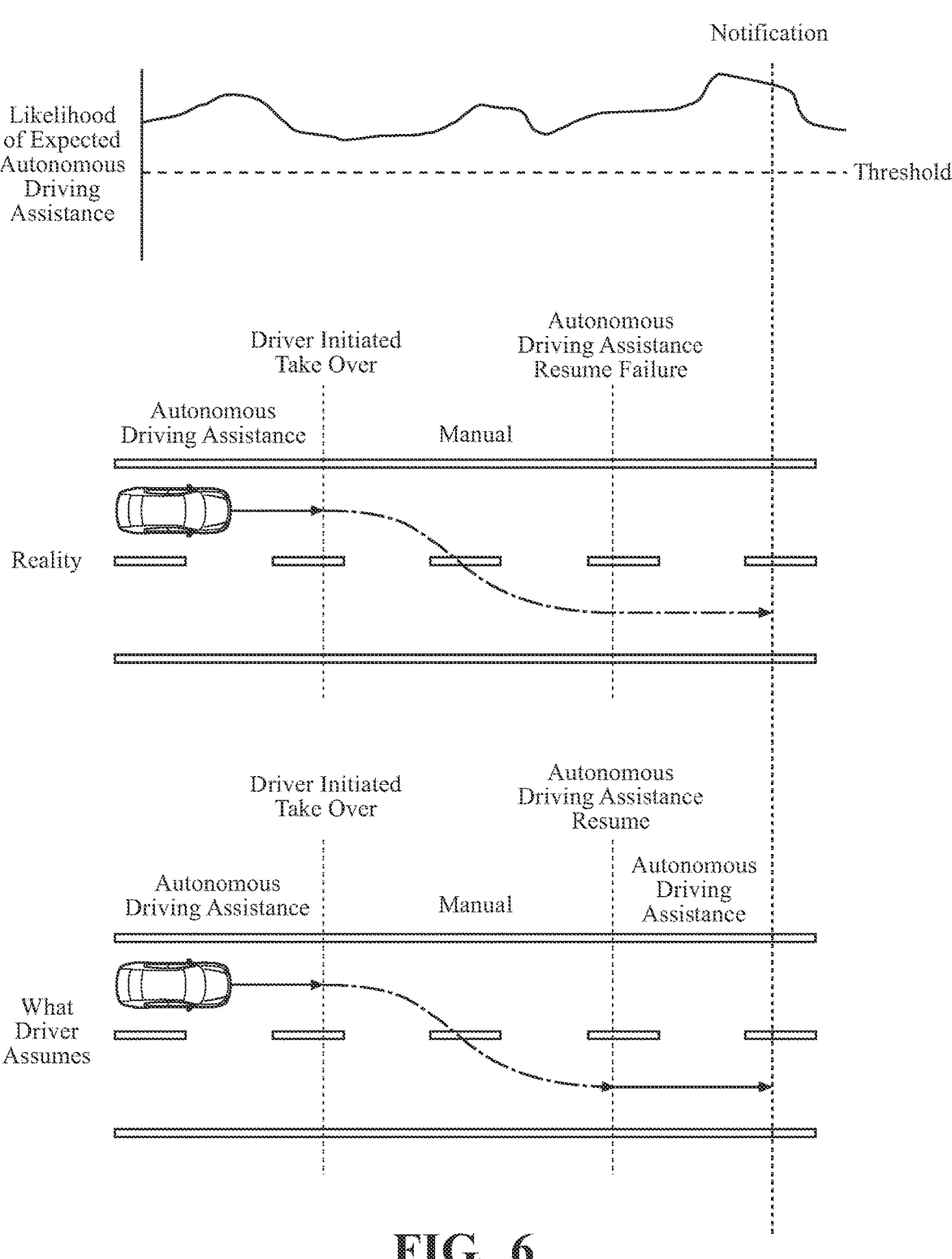
FIG. 6 illustrates one example of how the mode confusion avoidance system may be used to avoid potential mode confusion.

FIG. 6 illustrates an example of how the systems and methods described herein can be used to avoid mode confusion where a driver expects resumption of an autonomous driving assistance that did not occur. As shown in FIG. 6, a vehicle operator may be using autonomous driving assistance along a typical route used by the vehicle operator. Accordingly, command module 230 may select a routine path associated with the route and estimate a likelihood of expected autonomous driving assistance along the routine path. While travelling along the routine path, vehicle operator may then initiate a lane change though manual control. Upon completing the lane change, the driver may assume that the autonomous driving assistance has resumed. However, autonomous driving assistance may have failed to resume, such as due to road conditions. Upon the autonomous driving assistance having failed to resume, command module 230 may estimate a likelihood of expected autonomous driving assistance based on the routine path and if it exceeds a threshold generate a notification to the driver indicating that the autonomous driving assistance has not resumed as may be expected. Such a notification may be more intense, more frequent, or repeated more often as compared to any notification that would have occurred had the likelihood of expected autonomous driving assistance not exceeded the threshold.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the mode confusion avoidance system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the mode confusion avoidance system 170, and/or the automated driving module(s) 160 may control some or all of these vehicle systems 140 and, thus, may be partially or fully autonomous.

The processor(s) 110, the mode confusion avoidance system 170, and/or the automated driving module(s) 160 can be operatively connected to communicate with the various vehicle systems 140 and/or individual components thereof. For example, returning to FIG. 1, the processor(s) 110, the mode confusion avoidance system 170, and/or the automated driving module(s) 160 can be in communication to send and/or receive information from the various vehicle systems 140 to control the movement, speed, maneuvering, heading, direction, etc. of the vehicle 100. The processor(s) 110, the mode confusion avoidance system 170, and/or the automated driving module(s) 160 may control some or all of these vehicle systems 140.

The processor(s) 110, the mode confusion avoidance system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the mode confusion avoidance system 170, and/or the automated driving module(s) 160 can control the direction and/or speed of the vehicle 100. The processor(s) 110, the mode confusion avoidance system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the mode confusion avoidance system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality." as used herein, is defined as two or more than two. The term "another." as used herein, is defined as at least a second or more. The terms "including" and/or "having." as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method, comprising:
   selecting a routine path that includes usage data of prior autonomous driving assistance along the routine path;
   determining a likelihood of expected autonomous driving assistance based on the usage data and a vehicle location within the routine path; and
   generating a notification when autonomous driving assistance has not been enabled and the likelihood exceeds a threshold.

2. The method of claim 1, wherein determining the likelihood only occurs when the autonomous driving assistance was disabled by a manual control event.

3. The method of claim 1, wherein determining the likelihood only occurs when a vehicle determines based on control inputs that a resting state has occurred.

4. The method of claim 1, wherein selecting the routine path requires uniquely identifying a path routinely taken by a specific vehicle.

5. The method of claim 1, wherein selecting the routine path requires uniquely identifying a path routinely taken by a specific vehicle occupant.

6. The method of claim 1, wherein generating the notification further comprises increasing an intensity, a frequency, or a number of repetitions of the notification due to the likelihood exceeding the threshold.

7. The method of claim 1, wherein the notification contains information as to the autonomous driving assistance that is not in operation.

8. The method of claim 1, wherein selecting the routine path requires uniquely identifying a path routinely taken by a specific vehicle operator.

9. A system, comprising:
   a processor; and
   a memory communicably coupled to the processor and storing machine-readable instructions that, when executed by the processor, cause the processor to:
      select a routine path that includes usage data of prior autonomous driving assistance along the routine path;
      determine a likelihood of expected autonomous driving assistance based on the usage data and a vehicle location within the routine path; and
      generate a notification if autonomous driving assistance has not been enabled and the likelihood exceeds a threshold.

10. The system of claim 9, wherein the machine-readable instruction to determine the likelihood only occurs when the autonomous driving assistance was disabled by a manual control event.

11. The system of claim 9, wherein the machine-readable instruction to determine the likelihood only occurs when a vehicle determines based on control inputs that a resting state has occurred.

12. The system of claim 9, wherein the machine-readable instruction to select the routine path requires uniquely identifying a path routinely taken by a specific vehicle.

13. The system of claim 9, wherein the machine-readable instruction to select the routine path requires uniquely identifying a path routinely taken by a specific vehicle occupant.

14. The system of claim 9, wherein the machine-readable instruction to generate the notification further includes to increase an intensity, a frequency, or a number of repetitions of the notification due to the likelihood exceeding the threshold.

15. The system of claim 9, wherein the notification contains information as to the autonomous driving assistance that is not in operation.

16. A non-transitory computer-readable medium including instructions that when executed by one or more processors cause the one or more processors to:
   select a routine path that includes usage data of prior autonomous driving assistance along the routine path;
   determine a likelihood of expected autonomous driving assistance based on the usage data and a vehicle location within the routine path; and
   generate a notification if when autonomous driving assistance has not been enabled and the likelihood exceeds a threshold.

17. The non-transitory computer-readable medium of claim 16, wherein the instruction to determine the likelihood only occurs when the autonomous driving assistance was disabled by a manual control event.

18. The non-transitory computer-readable medium of claim 16, wherein the instruction to determine the likelihood only occurs when a vehicle determines based on control inputs that a resting state has occurred.

19. The non-transitory computer-readable medium of claim 16, wherein the instruction to select the routine path requires uniquely identifying a path routinely taken by a specific vehicle.

20. The non-transitory computer-readable medium of claim 16, wherein the instruction to select the routine path requires uniquely identifying a path routinely taken by a specific vehicle occupant.

\* \* \* \* \*